Patented Sept. 4, 1951

2,566,902

UNITED STATES PATENT OFFICE 2,566,902

VITREOUS MATERIAL AND METHOD OF MAKING

Frank L. Michael, Dalton, Mass., assignor to General Electric Company, a corporation of New York No Drawing. Application June 29, 1948,
Serial No. 35,971

10 Claims. (Cl. 106—39)

The present invention relates to a new and improved vitreous material and its method of manufacture. More particularly, it relates to a leadless vitreous material which may be easily molded, and which is characterized by superior electrical insulating qualities.

An object of the present invention is to provide a leadless vitreous material which is readily molded by the compression and transfer molding processes.

Other objects of the present invention are to provide a leadless insulating material which has low water absorptive qualities, low specific gravity, high dielectric strength and low power loss and power factor at high frequencies.

It has been found that such a leadless vitreous material may be made by using a binder compounded of cryolite, certain alkaline earth carbonates, boric acid and aluminum trihydrate.

More particularly, it has been found that a highly satisfactory leadless vitreous material may be manufactured by first making a binder consisting of a blend of cryolite, certain alkaline earth carbonates, boric acid and aluminum trihydrate, thoroughly mixed in certain proportions, heating to a temperature which will melt the mixture, quenching the molten glass in water, drying, and grinding to a fine powder. This bonding material or frit is then mixed with other material principally mica, though small amounts of cryolite, boric acid and sodium fluosilicate may be added, to form a final molding compound.

In forming the leadless binder or frit for the vitreous material, the following percentages by weight of raw materials may be used:

PREFERRED RANGE

| | Percent |
|---|---|
| Cryolite | 10–32 |
| Barium or strontium carbonate | 7–21 |
| Aluminum trihydrate | 11–21 |
| Boric acid | 37–67 |

PREFERRED COMPOSITIONS

Example 1

| | Percent |
|---|---|
| Cryolite | 20.5 |
| Barium carbonate | 9.6 |
| Aluminum trihydrate | 15.5 |
| Boric acid | 54.4 |

Example 2

| | Percent |
|---|---|
| Cryolite | 21.0 |
| Strontium carbonate | 7.4 |
| Aluminum trihydrate | 15.8 |
| Boric acid | 55.8 |

The above ingredients are mixed in a comminuted state until thorough mixing and blend has been attained. While specific materials have been mentioned which are preferably used, it is possible that other equivalent materials will occur to those skilled in the art. For example, other alkali fluorides may be used in lieu of cryolite so long as the amount of fluorine in the substitute is equivalent to that in the cryolite. Examples of such fluorides are sodium fluoride, sodium silico fluoride, sodium potassium fluoride, potassium fluoroborate, sodium fluoroborate, calcium fluoride, beryllium fluoride, potassium aluminum fluoride and potassium silico fluoride among others. While freshly precipitated aluminum trihydrate may be used if desired, the ordinary commercial product has been found to be entirely satisfactory.

Having obtained a complete intermingling of the raw materials, the mix is heated in a suitable vessel or container to a temperature of from about 900° C. to 1000° C. and preferably from about 900° C. to 950° C. to a clear melt. The material is quenched in water and ground to a fine powder.

The material or frit thus produced has a remarkably low water absorption tendency which makes it ideal for use as a binder for electrical insulating materials. For example, under identical test conditions, the preferred glass binder, Example 1, of the present invention when dried at 100° C. absorbed only 1.98% of its weight of water while another material containing potassium and sodium carbonates in place of the aluminum trihydrate absorbed 12.3% of its own weight of water when vitrified as in the present invention and 22.8% when not vitrified but merely sintered. When dried at 150° C. the binder of Example 1 absorbed 0.99% by weight of water while the comparison mix when vitrified absorbed 6.32% and when sintered, 7.09%. The importance of the low water absorptive qualities of the present binder is at once apparent when its use in a dielectric or insulating material is considered.

The molding characteristics of material in which the frit or binder of the present invention is used are also of a high order. With some variation in the proportions of ingredients used, insulating and dielectric materials may be obtained which lend themselves readily to compression and transfer molding. It will be noted that the ingredients of the material are in each case principally mica and the above binder. Small quantities of other materials such as cryolite and boric acid may be included in the formulation of the material which is to be bonded.

The preferred range of possible ingredients and the preferred composition of transfer molding composition are as follows, all quantities being in percentages by weight:

PREFERRED RANGE

| | Percent |
|---|---|
| Frit | 40–45 |
| Cryolite or sodium fluosilicate | 0–7.5 |
| Mica | 45–60 |

PREFERRED COMPOSITION

| | Percent |
|---|---|
| Frit (Example 1) | 50 |
| Cryolite | 5 |
| Mica | 45 |

For compression molding practice the following compositions have been found to be suitable.

PREFERRED RANGE

| | Percent |
|---|---|
| Frit | 15–50 |
| Cryolite or sodium fluosilicate | 0–7.5 |
| Mica | 50–85 |
| Boric acid | 0–2 |

PREFERRED COMPOSITIONS

Example A

| | Percent |
|---|---|
| Frit (Example 1) | 15 |
| Mica | 85 |

Example B

| | Percent |
|---|---|
| Frit (Example 1) | 30 |
| Cryolite | 2 |
| Mica | 66 |
| Boric acid | 2 |

In forming the final leadless material the finely divided ingredients are mixed thoroughly in the dry state. A small quantity of water is then added, mixing being continued until a dampened mix is obtained. In making a material for transfer molding usually from about 4%–5% of water is added, calculated on the total weight of the dry ingredients. For compression molding, particularly where larger parts are to be produced, from about 10% to 14% of water is added. The material is now ready for molding.

In transfer type molding preforms may be made in the usual manner. The preforms are heated at from 650° C. to 700° C. for from twelve to twenty minutes and preferably at about 675° C. Depending upon the thickness of the article, the latter is molded at a temperature of about 400° C. for from fifteen to ninety seconds at a mold pressure of 8 to 10 tons per square inch. The molded part which usually will be at a temperature of 300° C. to 350° C. is slowly cooled to room temperature.

In compression molding the preforms are preheated at temperatures ranging from 450° C. to 650° C. in a continuous oven for from one to five hours depending on the thickness of material. For example, a plate three-sixteenths inch thick would require a preheat of about one hour and thicker pieces progressively more time. Molding temperatures will vary from about 450° C. to 500° C. at a mold pressure of about 2½ tons per square inch. The molded article is cooled slowly to room temperature.

While I have given preferred conditions for molding the bonded material of my invention, I do not wish to be limited strictly thereto. I wish to protect also those variations which will occur to anyone skilled in the art and which are not at variance with the spirit of my invention.

Articles molded in accordance with my invention are characterized by superior strength, low water absorption, non-toxic properties and are readily worked and shaped by mechanical means. The absence of lead affords a composition of low specific gravity which substantially reduces the weight of articles fabricated therefrom. The electrical properties of the materials of my invention are superior in nature, typical values being as below:

TRANSFER MOLDING

| | |
|---|---|
| Frit (Example 1) percent | 50 |
| Cryolite do | 5 |
| Mica do | 45 |
| Power factor (1000 kilocycles) | 0.0022 |
| Dielectric constant (1000 kilocycles) | 6.9 |
| Dielectric strength (60 cycles, 25° C., 0.125 inch plate, volts per mil) | 400 |
| Arc resistance (seconds) | 275 |

COMPRESSION MOLDING

Example A

| | |
|---|---|
| Frit (Example 1) percent | 15 |
| Mica do | 85 |
| Power factor (1000 kilocycles) | 0.005 |
| Dielectric constant (1000 kilocycles) | 4.9 |
| Dielectric strength (60 cycles, 25° C., 0.188 inch plate, volts per mil) | 240 |
| Arc resistance (seconds) | 275 |

Example B

| | |
|---|---|
| Frit (Example 1) percent | 30 |
| Cryolite do | 2 |
| Mica do | 66 |
| Boric acid do | 2 |
| Power factor (1000 kilocycles) | 0.0013 |
| Dielectric constant (1000 kilocycles) | 6.8 |
| Dielectric strength (60 cycles, 25° C., 0.425 inch plate, volts per mil) | 225 |
| Arc resistance (seconds) | 275 |

What I claim as new and desire to secure by Letters Patent of the United States is:

1. A vitreous electrical insulating material comprising, by weight, from 45% to 85% mica and a binder comprising the vitrified product of a mixture consisting by weight of from 11% to 21% aluminum trihydrate, 7% to 21% of a carbonate selected from the class consisting of barium and strontium carbonates, 37% to 67% boric acid and a fluoride selected from the class consisting of cryolite, sodium fluoride, sodium silico fluoride, sodium potassium fluoride, potassium fluoroborate, sodium fluoroborate, calcium fluoride, beryllium fluoride, potassium aluminum fluoride, and potassium silico fluoride, said fluoride being present in an amount corresponding to from 10% to 32% cryolite based on the fluoride content of said fluoride.

2. A vitreous electrical insulating material comprising 85% mica and a binder consisting of the vitrified product of a mixture consisting of 15.5% aluminum trihydrate, 9.6% barium carbonate, 54.4% boric acid and 20.5% cryolite.

3. A vitreous electrical insulating material comprising 85% mica and a binder consisting of the vitrified product of a mixture consisting of 15.8% aluminum trihydrate, 7.4% strontium carbonate, 55.8% boric acid and 21% cryolite.

4. A vitreous electrical insulating material comprising by weight from 50% to 85% mica, about 2% cryolite, about 2% boric acid and from 15% to 50% of a binder comprising the vitrified product of a mixture consisting of 11% to 21% aluminum trihydrate, 7% to 21% of a carbonate selected from the class consisting of barium and strontium carbonates, 37% to 67% boric acid and 10% to 32% cryolite.

5. A vitreous electrical insulating material comprising 45% to 60% mica, about 5% cryolite and 40% to 55% of a binder comprising the vitrified product of a mixture consisting by weight of from 11% to 21% aluminum trihydrate, 7% to 21% of a carbonate selected from the class consisting of barium and strontium carbonates, 37% to 67% boric acid and 10% to 32% cryolite.

6. In the manufacture of electrical insulating material the process which comprises mixing from 11% to 21% by weight of aluminum trihydrate, 7% to 21% of a carbonate selected from the class consisting of barium and strontium carbonates, 37% to 67% boric acid, and a fluoride selected from the class consisting of cryolite, sodium fluoride, sodium silico fluoride, sodium potassium fluoride, potassium fluoroborate, sodium fluoroborate, calcium fluoride, beryllium fluoride, potassium aluminum fluoride and potassium silico fluoride, said fluoride being present in an amount corresponding to 10% to 32% cryolite based on the fluoride content of said fluoride, heating the mixture to a temperature at which the ingredients are melted, quenching the mixture in water to reduce it to a fine powder frit, mixing said frit with a material comprising mica in an amount corresponding to from 45% to 85% mica, balance substantially binder, adding a small quantity of water thereto and molding the resultant mixture under heat and pressure to the desired form.

7. A vitreous electrical insulating material comprising from 50% to 85% mica, about 2% boric acid and from 15% to 50% of a binder comprising the vitrified product of a mixture consisting of 11% to 21% aluminum trihydrate, 7% to 21% of a carbonate selected from the class consisting of barium and strontium carbonates, 37% to 67% boric acid and 10% to 32% cryolite.

8. A vitrified electrical insulating material comprising 50% to 85% mica, about 5% cryolite and 15% to 50% of a binder comprising the vitrified product of a mixture consisting by weight of 11% to 21% aluminum trihydrate, 7% to 21% of a carbonate selected from the class consisting of barium and strontium carbonates, 37% to 67% boric acid and 10% to 32% cryolite.

9. A vitreous electrical insulating material comprising 50% to 85% mica and 15% to 50% by weight of a binder comprising the vitrified product of a mixture consisting by weight of from 11% to 21% aluminum trihydrate, 7% to 21% of a carbonate selected from the class consisting of barium and strontium carbonates, 37% to 67% boric acid and 10% to 32% cryolite.

10. A vitreous electrical insulating material comprising 45% to 60% mica and 40% to 55% of a binder comprising the vitrified product of a mixture consisting of from 11% to 21% aluminum trihydrate, 7% to 21% of a carbonate selected from the class consisting of barium and strontium carbonates, 37% to 67% boric acid and 10% to 32% cryolite.

FRANK L. MICHAEL.

No references cited.